C. H. Finson.
Meat Chopper.
N° 90,737. Patented Jun. 1, 1869.
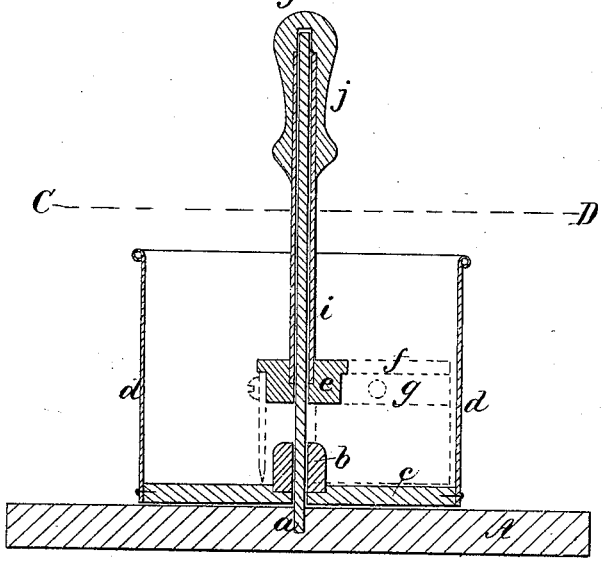
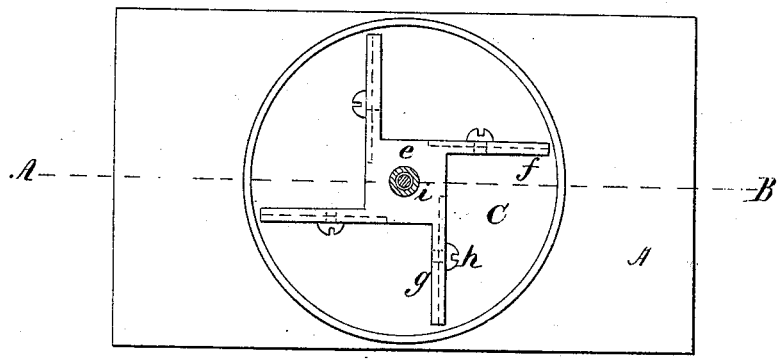
Witnesses
H. K. Porter
E. F. O'Neil
Inventor
C. H. Finson
By T. W. Porter Atty

United States Patent Office.

CHARLES H. FINSON, OF BANGOR, MAINE, ASSIGNOR TO HIMSELF AND JOSEPH SEMPLE, OF SAME PLACE.

Letters Patent No. 90,737, dated June 1, 1869.

IMPROVED MEAT-CHOPPER.

The Schedule referred to in these Letters Patent and making part of the same.

*To all whom it may concern:*

Be it known that I, CHARLES H. FINSON, of Bangor, in the county of Penobscot, and State of Maine, have invented a new and useful Improvement in Meat-Choppers; and I do hereby declare that the following is a full, clear, and exact description of the construction and operation of the same, reference being had to the accompanying drawings, making a part of this specification, in which—

Figure 1 is a vertical section, taken on line A B, fig. 2, and

Figure 2 is a horizontal section, taken on line C D, fig. 1.

Similar letters of reference indicate corresponding parts in the several figures.

The nature of my invention consists in a chopper, constructed with a receptacle or dish, to be rotated by hand, in the bottom of which is inserted a hollow cone, through which passes, loosely, a spindle, which is fixed in a movable platform, on which the dish rests; the knife consisting of a square centre, with four wings, to which blades are attached, a tube being inserted in the centre, and a handle affixed to the upper end of the tube, which tube slides upon the central rod above mentioned, thereby guiding the movement of the knife, and allowing a rotary motion thereof if desired.

In the drawings—

A represents the base or platform, in which the spindle $a$ is rigidly inserted;

$c$ is the bottom of the dish; and $d\ d$ are the sides or rim.

$b$ is the hollow cone, which is secured in bottom $c$.

$e$ is a square metallic centre, formed with four wings, $f\ f\ f\ f$, which are placed tangential to a circle of the diameter of centre $e$.

The cutting-blades $g\ g$ are attached to the wings $f$ by screws $h$, as shown.

$i$ is the tube, which is firmly secured in centre $e$, and

J is the handle, which is attached to tube $i$, as shown.

In use, the cutting-knife is actuated by grasping handle J with one hand, while with the other the dish is gradually rotated, the spindle $a$, in connection with tube $i$, serving to guide the knife, while the number and arrangement of the blades insure a uniform and certain execution of work, and the peculiar arrangement of the knives allows of their being ground without removal from the centre.

What I claim as new, and desire to secure by Letters Patent, is—

1. A meat-chopper, so constructed and arranged that the dish and the blades may both be rotated upon a common centre, substantially in manner as and for the purposes specified.

2. The combination and arrangement of platform A, with spindle $a$ inserted therein, the tube $i$ sliding upon rod $a$, and having secured to A the handle J and the cutting-blades and the chopping-dish, all arranged to operate substantially in manner as and for the purposes specified.

CHARLES H. FINSON.

Witnesses:
H. L. MITCHELL,
J. R. CLARK.